United States Patent [19]
Janssens et al.

[11] Patent Number: 6,122,751
[45] Date of Patent: Sep. 19, 2000

[54] PIPELINED DATA PROCESSING CIRCUIT

[75] Inventors: Mark A. E. Janssens, Leuven; Stefaan M. M. Note, Berchem, both of Belgium

[73] Assignee: U.S. Philips Corporation, New York, N.Y.

[21] Appl. No.: 08/798,196

[22] Filed: Dec. 9, 1996

Related U.S. Application Data

[63] Continuation of application No. 08/673,829, Jun. 27, 1996.

[30] Foreign Application Priority Data

Jun. 27, 1995 [EP] European Pat. Off. .............. 95201748

[51] Int. Cl.$^7$ ............................... G06F 13/00; G06F 1/10
[52] U.S. Cl. ............................................... 713/600; 712/1
[58] Field of Search .................................. 713/320, 322, 713/600; 326/93, 96, 99, 101, 113, 114; 377/64, 73, 77, 78; 712/1

[56] References Cited

U.S. PATENT DOCUMENTS 3,972,031  7/1976  Riemenschneider et al. ............ 365/78
4,839,604  6/1989  Tanahashi ................................. 327/297
4,876,704  10/1989  Ozaki ..................................... 377/77 X
5,528,177  6/1996  Sridhar et al. ........................... 326/113

*Primary Examiner*—Thomas M. Heckler
*Attorney, Agent, or Firm*—Tony E. Piotrowski

[57] ABSTRACT

A pipelined circuit contains a cascade of stages, each with an intial register followed by a combinatorial logic circuit. The registers are clocked. At the beginning of each clock period, data in the initial register is updated. After that, during the clock period, data propagates from the initial register, along a path through the combinatorial logic circuits, to the initial register in the next stage where it is stored at the beginning of the next cycle. In the path there are several other registers, in which the data is stored at intermdiate phases of the clock cycle, while the data is kept in the initial register. Thus differences in propagation delay along different branches of the path are eliminated without increasing the number of clock cycles needed to pass data through the pipelined circuit. This reduces the number glitches which consume energy without affecting the function of the circuit.

7 Claims, 2 Drawing Sheets

PIPELINED DATA PROCESSING CIRCUIT

This is a continuation of application Ser. No. 08/673,829, filed Jun. 27, 1996.

BACKGROUND OF THE INVENTION

1. Field of the Invention

The invention relates to a pipelined data processing circuit comprising
- a first register,
- a cascade of at least three stages, the first register being coupled to an input of the cascade,
- each stage comprising an input, an output, a combinatorial circuit part and a register, the input being coupled to the output via the combinatorial circuit part and the register successively, the output of each stage except a final stage being coupled to the input of a next stage in the cascade,
- clock means coupled to the registers, for controlling latching of data samples into the registers, data samples being latched once every cycle of a clock signal, the first register and the register in the final stage of the cascaded latching data samples in substantially the same phase of the cycle, the registers in the other stages of the cascade latching data samples at mutually different intermediate phases.

2. Description of The Related Art

Such a pipelined data processing circuit is known from U.S. Pat. No. 4,839,604.

Pipelining is a technique for increasing the sample rate at which data can be processed. Pipelining involves subdividing the combinatorial logic circuit into a cascade of combinatorial logic circuit parts separated from each other by registers. The registers are clocked in phase with each other, a sample of the data being latched into the registers once every cycle of the clock signal. During the cycle, each combinatorial circuit part computes output data as a function of its input data (this will be referred to as propagation of the data). The duration of the cycle has to be as least as long as the time-interval that the slowest combinatorial circuit part needs to compute output data as a function of its input data. This time-interval is much less than the time-interval needed for output data computation by the entire combinatorial circuit.

Pipelining has the additional advantage that it reduces power consumption. This is because pipelining reduces the number of glitches, i.e. pairs of logically meaningless, mutually opposite level transitions at the outputs of logic gates in the combinatorial circuit. Glitches may be caused as follows. The combinatorial circuit may have different circuit branches connected in parallel between an input and a multi-input logic gate, like a NAND gate. If the propagation delay time along the different circuit branches differs too much, data from the different branches may cause separate transitions at the output of the multi-input logic gate. These transitions have no independent meaning: they are glitches. When the part of the combinatorial logic circuit between successive registers is short, the differences in propagation delay will so small that the output of the multi-input logic gate will not exhibit glitches.

Pipelining has the disadvantage that it increases latency. The latency of the circuit is the number of clock cycles between the arrival of data at the input of the circuit and its arrival at the output. Latency is proportional to the number of registers in the circuit. Latency is particularly inconvenient when the circuit contains a feedback loop: the risk of instability of such loops increases as latency increases.

SUMMARY OF THE INVENTION

It is inter alia an object of the invention to reduce the power consumption of pipelined circuits without increasing latency.

It is inter alia a further object of the invention to reduce the power consumption of pipelined circuits with feedback loops without causing additional instability problems.

The pipelined data processing circuit according to the invention is characterized, in that clock means are arranged to control the intermediate phases such that the data propagates through the cascade from the first register to the register in the final stage of the cascade within a single cycle. Thus, the second and third register do not contribute to latency. The cycle time, that is, the time between successive samples will be at least the time needed for data to propagate through the combinatorial circuit parts from the first to the fourth register. Hence, the second and third register do not contribute towards reducing the cycle time.

In an embodiment of the pipelined data processing circuit the combinatorial circuit in at least one stage, which is not an initial stage of the cascade, comprises a multi-input logic gate, the combinatorial circuit in a further one of the stages, which precedes the at least one stage in the cascade, containing at least two sub-parts, each having an output connected to the register of the further stage, the register coupling data from the outputs in parallel to separate inputs of the multi-input logic gate, propagation delays from the first register to the multi-input logic gate, via the respective sub-parts being mutually equalized by latching in the register in the further stage, to an extent that glitches at an output of the multi-input logic gate are avoided.

An embodiment of the pipelined data processing circuit contains a loop in which data from the output of the final stage is fed back to the first register. Thus the at least one of the second and third register reduces power consumption by preventing glitches. Thus the additional registers in the feedback loop do not affect the number of cycles that is required for data to propagate along the loop. As a consequence power consumption due to glitches is reduced without compromising the stability of the loop.

BRIEF DESCRIPTION OF THE DRAWINGS

These and other advantageous aspects of the invention will be described with the aid of figures, of which

DETAILED DESCRIPTION OF THE PREFERRED EMBODIMENTS

Figure 1:
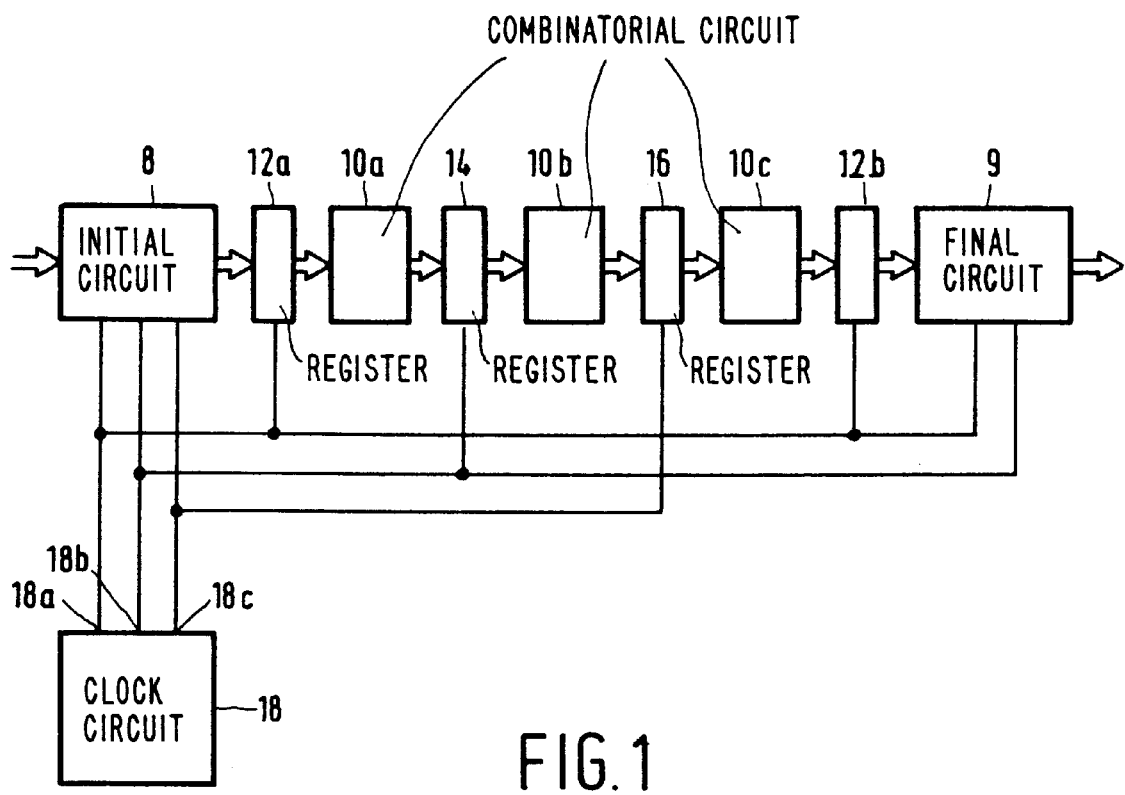
FIG. 1 shows a pipelined data-processing circuit according to the invention

FIG. 1 shows a pipelined data-processing circuit according to the invention. The circuit contains an initial circuit 8 and a final circuit 9. The initial circuit 8 is coupled to the final circuit 9 via a cascade of four registers 12*a–b*, 14, 16, with a combinatorial circuit part 10*a–c* between each pair of successive registers 12*a–b*, 14, 16. Each combinatorial circuit part 10*a–c* contains one or more logic gates and interconnections between the logic gates mutually and to the inputs and outputs of the combinatorial circuit part 10*a–c*.

The circuit contains a clock circuit 18 which has an three outputs 18*a–c*. The first output 18*a* is coupled to the first and fourth registers 12*a–b* in the cascade. The second and third outputs 18*b–c* are coupled to the second and third register in the cascade respectively. Each of the three outputs 18*a–c* is also coupled to both the initial circuit 8 and the final circuit 9.

In operation the clock circuit 18 produces a first, second and third, mutually different clock signal at its outputs 18*a–c*.

Figure 2:
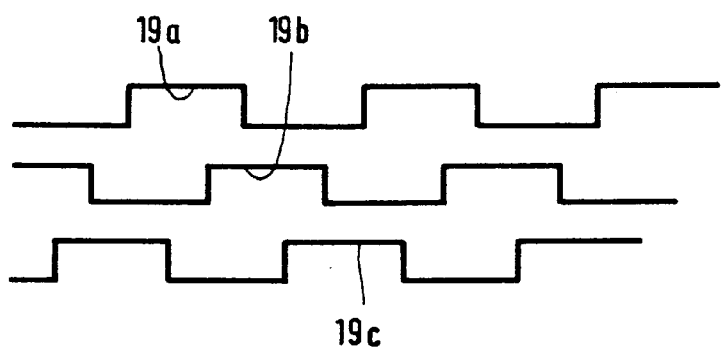
FIG. 2 shows three clock signals

FIG. 2 shows the clock signals 19*a–c*. The signals 19*a–c* are all periodic with the same period, but differ in phase. The second clock signal 19*b* is fed to the second register 14 in the cascade and is delayed by a third of the period with respect to the first clock signal 19*a* that is fed to the first and fourth register 12*a–b* cascade. The third clock signal 19*c* is fed to the third register 16 in the cascade and is delayed by a third of the period with respect to the second clock signal 19*b*.

In operation the pipeline circuit receives data and outputs data that is a combinatorial function of that data. This combinatorial function is subdivided into successive parts. The parts of the combinatorial function are computed separately and the results stored in registers.

A data sample is input to the initial circuit 8. This data sample is processed in the initial circuit and the result reaches the first register 12*a* after a certain propagation time. On the rising edge of the first clock signal 19*a* this result is latched into the first register 12*a*, and subsequently output from that register 12*a* as a data sample. The first combinatorial circuit part 10*a* receives this data sample of the first register 12*a* and computes output data as a logic function of it. The result of the computation by the first combinatorial circuit part 10*a* reaches the second register 14 and is latched in that register 14 on the rising edge of the second clock signal 19*b*. This result is then processed by the second combinatorial circuit part 10*b* and the result of that is latched into the third register 16 on the rising edge of the third clock signal. Finally the third combinatorial circuit part 10*c* processes data from the third register 16, the result being latched into the fourth register 12*b* on the rising edge of the first clock signal.

From the fourth register the result is supplied to the final circuit 9. The initial and final circuits 8, 9 themselves may contain further registers clocked in phase with the first and fourth registers 12*a–b* and furthermore have a similar structure as the cascade 12*a–b*, 14, 16 10*a–c*, with registers clocked in phase with the second and third registers 14, 16.

Thus, in one period of the first clock signal 19*a* data propagates from the first register 12*a* to the fourth register 12*b*. Data is latched into these registers 12*a–b* once every period. In each new period the process is repeated for new data samples. A period of the first clock signal 19*a* therefore constitutes an operating cycle of the pipelined circuit. A data sample is kept in the first register 12*a* throughout the cycle. During the cycle data resulting from the data sample in the first register 12*a* is latched into the second register 14 and data resulting from the data sample latched in the third register 16. Replacement of the second and third register by a through-connection would not affect the logic function of the circuit nor its sample rate. However the use of registers 14, 16 instead of through-connections results in lower power dissipation, as will be illustrated using FIG. 3.

Figure 3:
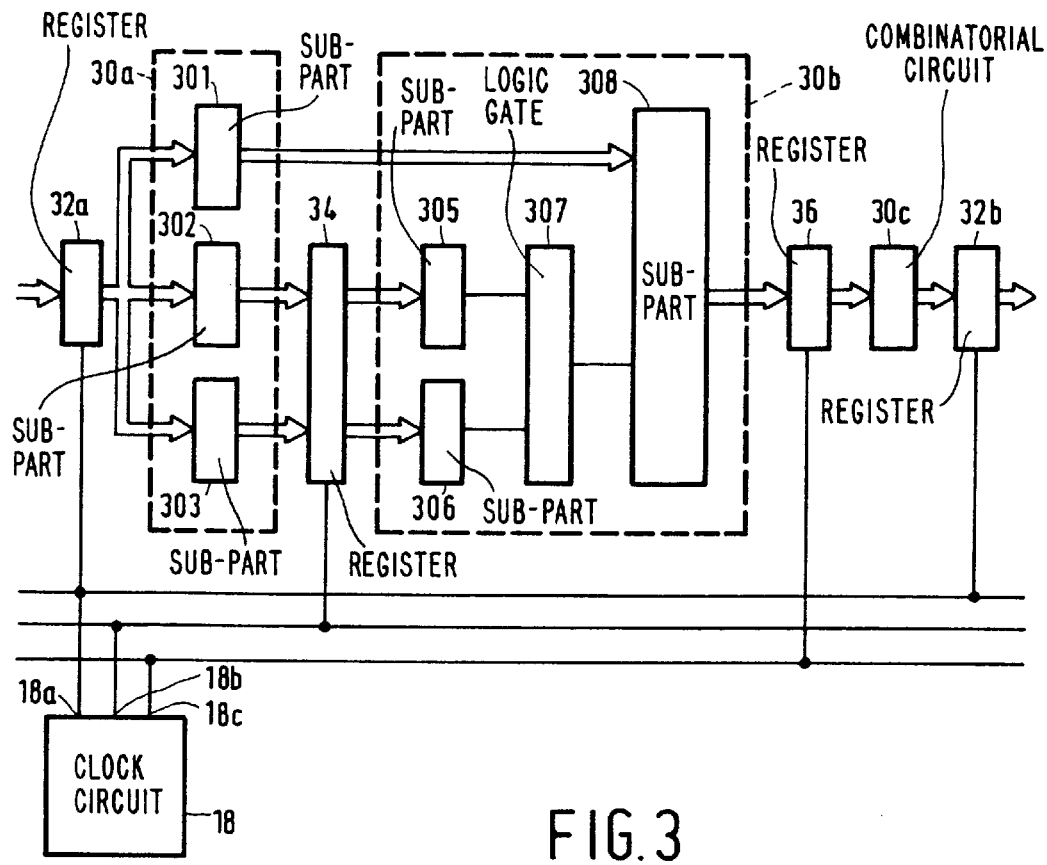
FIG. 3 shows part of a pipelined data-processing circuit according to the invention

FIG. 3 shows part of a pipelined data-processing circuit according to the invention. FIG. 3 shows a first register 32*a*, coupled to a first combinatorial circuit part 30*a*. The combinatorial circuit part 30*a* is coupled to a second register 34. The first combinatorial circuit part 30*a* and the second register 34 are coupled to a second combinatorial circuit part 30*b*, which in turn is coupled to a third register 36. The third register 36 is coupled to a fourth register 32*b* via a third combinatorial circuit part.

FIG. 3 also shows the clock circuit 18, the first output being coupled to the first and fourth register 32*a–b*, and the second and third output being coupled to the second and third register 34, 36 respectively.

The second combinatorial circuit part 30*b* contains a first and second sub-part 305, 306, a multi-input logic gate 307 and a third sub-part 308. The first and second sub-part 305, 306 have inputs coupled to the second register 34. The first and second sub-part each have an output coupled to a multi-input logic gate 307. An output of the multi-input logic gate 307 is coupled to an input of the third sub-part 308. The output of the third sub-part 308 is coupled to the third register 36.

The first combinatorial circuit part 30*a* contains three sub-parts 301, 302, 303 each having an input coupled to the first register. An output of a first of these sub-parts 301 is coupled to an input of the third sub-part 308 of the second combinatorial logic circuit part 30*b*. Outputs of a second and third of these sub-parts 302, 303 are coupled to the second register 34.

In operation data is processed by the second and third sub-parts 302, 303 of the first combinatorial logic circuit part 30*a* and the respective results are latched into the second register on the positive edge of the second clock signal 19*b*. Subsequently these results are supplied to the multi-input logic gate 307 via the first and second sub-parts 305, 306 respectively.

Without affecting the function of the circuit, the second register 34 may be replaced by a through-connection, that is the sub-parts 302, 303 of the first combinatorial logic circuit part 30*a* may be connected directly to the first and second sub-part 305, 306 of the second combinatorial logic circuit part 30*b*. This is because a data sample is output from the first register 32*a* is output during an entire cycle and during this cycle data propagates from the first register 32*a* to the fourth register 32*b* both if the second register 34 latches data after a third of the period and if the second register is replaced by through-connection. To illustrate this, the output of one sub-part 301 of the first combinatorial circuit part 30*a* has been connected to the second combinatorial circuit part 30*b* directly, bypassing the second register 34.

However, use of the second register 34 instead of a through connection results in a reduction in power consumption when there is a substantial difference between the respective time-intervals needed for the data to propagate from the first register 32*a* through the two sub-parts 302, 303 respectively. In the case of a through-connection this difference has as a consequence that there is a difference between the time-intervals needed for data to travel from the first register 32*a* to the respective inputs of the multi-input logic gate 307.

Consequently, a change in data value on one input of the multi-input logic gate 307 may arrive before a change in the data value on another input. The difference in arrival time may be so substantial that it causes the output of the multi-input logic gate 307 to assume an intermediate value after arrival of the first data value and before the arrival of the other data value. In that case the output of the multi-input logic gate 307 may exhibit two mutually cancelling transitions (a glitch). Each transition will cause the circuit to consume energy, but the effect on the resulting data latched in the fourth register 32*b* at the end of the cycle will be the same as if no glitch had occurred.

When the second register 34 is not replaced by a through connection, it will eliminate the effect upon the multi-input logic gate 307 of the difference between the respective time-intervals needed for the data to propagate from the first register 32*a* through the two sub-parts 302, 303. Hence this difference does not cause a glitch and power consumption will be reduced (provided the difference in time interval caused by the first and second sub-part 305, 306 of the second combinatorial circuit part 30b are not substantial in the sense defined hereinbefore).

Hence power consumption can be reduced by inserting registers in the cascade in front of the inputs of multi-input logic gates and latching data into these registers during a cycle in which data is allowed to travel along a data-path through those multi-input logic gates, in order to efface differences in travelling time.

Of course multi-input logic gates may occur in each of the combinatorial logic circuit parts 40a–c, and power consumption will be saved in each of the circuit parts 40a–c. Furthermore, although FIGS. 1 and 3 show three combinatorial logic circuit parts with registers in between, the invention is not limited to this number: any number of additional subdivisions of the combinatorial logic circuit parts with further register inserted between them may be used. These registers are clocked with further signals from the clock that have intermediate phases. The exact phase of these clock signals is not critical, as long as successive registers are clocked later as they are farther along the cascade and as long as there is enough time for the data to propagate from one register to the other during the cycle before the other register is clocked.

Figure 4:
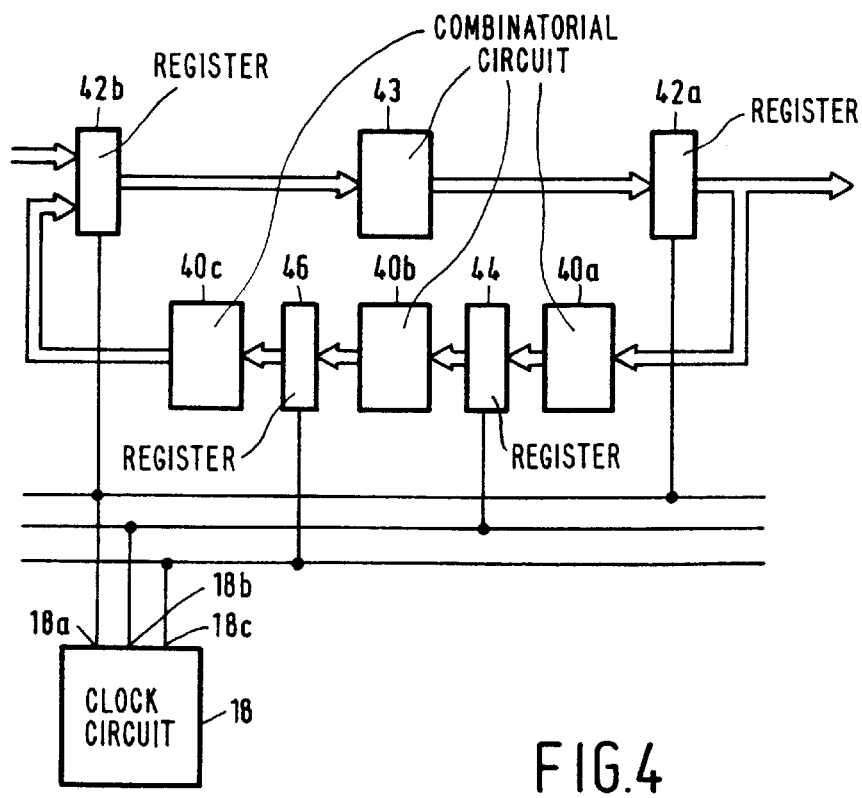
FIG. 4 shows part of a pipelined data-processing circuit according to the invention containing a feedback loop

FIG. 4 shows part of a pipelined data-processing circuit containing a feedback loop. The circuit has an input coupled to a register 42b, called the fourth register in order to be consistent with the preceding figures. The output of the fourth register 42b is coupled to a first register 42a via a first combinatorial logic circuit 43. The output of the first register 42a is coupled to the input of a second register 44 via a first combinatorial logic circuit part 40a. The output of the second register 44 is coupled to the input of a third register 46 via a second combinatorial logic circuit part 40b. The output of the third register is coupled to an input of the fourth register 42b via a third combinatorial logic circuit part 40c.

The registers 42a–b, 44, 46 each have a clock input. The first and fourth register are coupled the first output 18a of the clock 18. The second and third register 44, 46 are coupled to the second and third output 18b, 18c of the clock 18 respectively.

In operation the feedback loop from the first register 42a to the fourth register 42b operates as the cascade described in the context of FIG. 1: in each cycle a data sample propagates from the first register 42a to the fourth register 42b and once every cycle data is latched in the fourth register 42b. During the cycle, data is latched in the second and third register 44, 46. This reduces power consumption without affecting the fact data reaches the fourth register in a single cycle.

The problem to design a stable loop become increasingly difficult as increasingly more cycles are needed to travel around the loop. Data may propagate in one cycle through the combinatorial logic circuit 43 from the fourth register 42b to the first register 42b. Thus, it takes two cycles for data to travel around the loop in FIG. 4. A loop that requires only a few cycles, like the one in FIG. 4, can more easily be made stable.

What is claimed:

1. A data processing circuit comprising:
   a first register;
   a cascade of at least three stages, the first register being coupled to an input of the cascade, each stage including an input, an output, a combinatorial circuit part and a register, the input being coupled to the output via the combinatorial circuit part and the register successively, the output of each stage except a final stage being coupled to the input of a next stage in the cascade; and
   a clock coupled to the registers,
   wherein the first register and the register in the final stage of the cascade, latch data in substantially a same phase of a cycle, the registers in the other stages of the cascade latching data samples at mutually different intermediate phases, and
   wherein the clock is arranged to control the intermediate phases such that the data propagates through the cascade from the first register to the register in the final stage of the cascade within a single clock cycle.

2. A data processing circuit according to claim 1, wherein one combinatorial circuit in at least one stage, which is not an initial stage of the cascade, includes a multi-input logic gate, another combinatorial circuit in another of the stages, which precedes the at least one stage in the cascade, containing at least two sub-parts, each having an output connected to the register of the another stage, the register coupling data from the outputs in parallel to separate inputs of the multi-input logic gate, propagation delays from the first register to the multi-input logic gate, via the respective sub-parts being mutually equalized by latching in the register in the another stage, to an extent that glitches at an output of the multi-input logic gate are substantially avoided.

3. A data processing circuit according to claim 1, containing a loop in which data from the output of the final stage is fed back to the first register.

4. A circuit comprising:
   a plurality of registers;
   a plurality of combinatorial circuits arranged between respective registers of the plurality of registers to form a cascade; and
   a clock circuit coupled to each of the plurality of registers,
   wherein a first register and a final register in the cascade, latch data in substantially a same phase of a cycle, other registers in the cascade latch data at a phase different from the same phase, and
   wherein the data propagates through the cascade from the first register to the final register within a single clock cycle.

5. A circuit according to claim 4, wherein one of the plurality of combinatorial circuits includes a multi-input logic gate, and a second combinatorial circuit, which precedes the one combinatorial circuit, includes a plurality of sub-parts, each having an output connected to one of the plurality of registers that precedes the one combinatorial circuit, the one register coupling data from the outputs in parallel to separate inputs of the multi-input logic gate, and wherein a propagation delay from the first register to the multi-input logic gate, via the respective sub-parts being mutually equalized by latching in the one register.

6. A circuit according to claim 4, wherein the circuit is a pipelined data-processing circuit.

7. A circuit according to claim 6, further comprising a feedback loop in which the first register is coupled to one of the plurality of registers via one of the combinatorial circuits.

* * * * *